United States Patent
Ohachi et al.

(10) Patent No.: US 11,718,260 B2
(45) Date of Patent: Aug. 8, 2023

(54) VEHICLE OCCUPANT PROTECTION DEVICE

(71) Applicant: TOYOTA JIDOSHA KABUSHIKI KAISHA, Toyota (JP)

(72) Inventors: Jiro Ohachi, Shizuoka-ken (JP); Mitsuyoshi Ohno, Miyoshi (JP); Masashi Hotta, Gifu-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/728,446

(22) Filed: Apr. 25, 2022

(65) Prior Publication Data
US 2023/0010582 A1    Jan. 12, 2023

(30) Foreign Application Priority Data
Jul. 7, 2021  (JP) ................. 2021-112656

(51) Int. Cl.
*B60R 21/207*    (2006.01)
*B60R 21/231*    (2011.01)
(Continued)

(52) U.S. Cl.
CPC ........... *B60R 21/207* (2013.01); *B60N 2/885* (2018.02); *B60N 2/888* (2018.02); *B60R 21/231* (2013.01);
(Continued)

(58) Field of Classification Search
CPC ........... B60R 21/2338; B60R 21/207; B60R 21/23138; B60R 21/231; B60R 21/237;
(Continued)

(56) References Cited

U.S. PATENT DOCUMENTS 6,120,099 A * 9/2000 Reikerås ............... B60N 2/868
297/391
7,549,672 B2 6/2009 Sato et al.
(Continued)

FOREIGN PATENT DOCUMENTS

CN       102582565 A  *  7/2012
DE  102014201474 A1  *  7/2015  ........... B60R 21/207
(Continued)

OTHER PUBLICATIONS

Office Action dated Feb. 7, 2023 to U.S. Appl. No. 17/706,032, filed Mar. 28, 2022.
(Continued)

*Primary Examiner* — Keith J Frisby
(74) *Attorney, Agent, or Firm* — Dinsmore & Shohl LLP (57) ABSTRACT

A vehicle occupant protection device includes: an airbag main body that includes a front-rear chamber that is deployed to a seat front side along a side of a head of an occupant by a gas ejected from an inflator operated when a collision of a vehicle is detected or predicted, and a tip end chamber that is deployed inward in a seat width direction from an end portion of the front-rear chamber on the seat front side; and a headrest that includes a main body portion that supports the head of the occupant from a seat rear side, and a side portion that is provided on at least a side of the main body portion, that protrudes to the seat front side until a deployment of the front-rear chamber is completed, and that is interposed between the front-rear chamber and the head of the occupant.

8 Claims, 8 Drawing Sheets

(51) Int. Cl.
  *B60N 2/888* (2018.01)
  *B60N 2/885* (2018.01)
  *B60R 21/2338* (2011.01)

(52) U.S. Cl.
  CPC .. *B60R 21/2338* (2013.01); *B60R 2021/2074* (2013.01); *B60R 2021/23146* (2013.01); *B60R 2021/23161* (2013.01); *B60R 2021/23386* (2013.01)

(58) Field of Classification Search
  CPC ........ B60R 21/2334; B60R 2021/2074; B60R 2021/23386; B60R 2021/0048; B60R 2021/23146; B60R 2021/23161; B60R 2021/161; B60N 2/888; B60N 2/885
  USPC ...... 280/730.1, 730.2, 743.1, 743.2; 297/391
  See application file for complete search history.

(56) References Cited

U.S. PATENT DOCUMENTS

| | | | |
|---|---|---|---|
| 8,485,553 B1* | 7/2013 | Kuhne | B60R 21/205 280/743.2 |
| 8,985,622 B1* | 3/2015 | Cannon | B60R 21/231 280/730.2 |
| 9,994,181 B1 | 6/2018 | Dubaisi et al. | |
| 10,336,283 B2 | 7/2019 | Rickenbach et al. | |
| 10,543,801 B2 | 1/2020 | Kwon | |
| 10,710,539 B2 | 7/2020 | Cho et al. | |
| 10,870,405 B2 | 12/2020 | Kwon | |
| 11,390,235 B2 | 7/2022 | Kim | |
| 2006/0131847 A1 | 6/2006 | Sato et al. | |
| 2012/0242067 A1* | 9/2012 | Kino | B60R 21/231 493/405 |
| 2013/0234421 A1* | 9/2013 | Honda | B60R 21/23138 280/730.2 |
| 2014/0284907 A1 | 9/2014 | Akiyama | |
| 2016/0082915 A1* | 3/2016 | Madaras | B60R 21/013 297/216.19 |
| 2018/0236962 A1* | 8/2018 | Ohno | B60R 21/207 |
| 2019/0161053 A1 | 5/2019 | Gwon et al. | |
| 2019/0176739 A1* | 6/2019 | Song | B60R 21/207 |
| 2019/0225184 A1 | 7/2019 | Ohno | |
| 2021/0138989 A1 | 5/2021 | Markusic et al. | |
| 2022/0355758 A1* | 11/2022 | Freisler | B60R 21/207 |
| 2022/0388472 A1 | 12/2022 | Hwangbo et al. | |
| 2022/0396231 A1 | 12/2022 | Ohno et al. | |
| 2022/0396233 A1 | 12/2022 | Ohno et al. | |
| 2023/0064279 A1 | 3/2023 | Ohno et al. | |

FOREIGN PATENT DOCUMENTS

| | | | | |
|---|---|---|---|---|
| DE | 102018104392 A1 | | 8/2019 | |
| DE | 102019103484 A1 | | 8/2019 | |
| DE | 102020109466 A1 | | 4/2021 | |
| DE | 102020118337 A1 | | 1/2022 | |
| DE | 102020118339 A1 | | 1/2022 | |
| DE | 102020123629 A1 | | 3/2022 | |
| JP | 2000062562 A | | 2/2000 | |
| JP | 2002211338 A | | 7/2002 | |
| JP | 2006-008105 | | 1/2006 | |
| JP | 2007191077 A | | 8/2007 | |
| JP | 2010-076640 A | | 4/2010 | |
| JP | 2013018378 A | * | 1/2013 | |
| JP | 2014184805 A | | 10/2014 | |
| JP | 2019511414 A | | 4/2019 | |
| JP | 2019-127101 A | | 8/2019 | |
| JP | 2019218013 A | | 12/2019 | |
| JP | 2021049898 A | | 4/2021 | |
| KR | 20080003201 A | * | 1/2008 | |
| KR | 20200075065 A | | 6/2020 | |
| WO | 2016174785 A1 | | 11/2016 | |
| WO | WO-2017099398 A1 | * | 6/2017 | ............. B60R 21/16 |
| WO | 2019121222 A1 | | 6/2019 | |
| WO | 2019-166268 | | 9/2019 | |
| WO | WO-2021121737 A1 | * | 6/2021 | ....... B60R 21/23138 |
| WO | 2022053331 A1 | | 3/2022 | |

OTHER PUBLICATIONS

Non-Final Office Action dated Feb. 7, 2023 to U.S. Appl. No. 17/712,703, filed Apr. 4, 2022.
Non-Final Office Action dated Jan. 31, 2023 to U.S. Appl. No. 17/950,633, filed Sep. 22, 2022.
Non-Final Office Action dated Mar. 2, 2023 to U.S. applicatoin No. U.S. Appl. No. 17/886,098, filed Aug. 11, 2022.
Notice of Allowance dated Apr. 18, 2023, Issued to U.S. Appl. No. 17/706,032, filed Mar. 28, 2022.
Notice of Allowance dated Apr. 14, 2023, Issued to U.S. Appl. No. 17/712,703 filed Apr. 4, 2022.
Notice of Allowance dated May 16, 2023, Issued to U.S. Appl. No. 17/866,098, filed Aug. 11, 2022.
Notice of Allowance dated May 30, 2023, Issued to U.S. Appl. No. 17/950,633, filed Sep. 22, 2022.

* cited by examiner

VEHICLE OCCUPANT PROTECTION DEVICE

CROSS-REFERENCE TO RELATED APPLICATION

This application claims priority to Japanese Patent Application No. 2021-112656 filed on Jul. 7, 2021, incorporated herein by reference in its entirety.

BACKGROUND

1. Technical Field

The present disclosure relates to a vehicle occupant protection device.

2. Description of Related Art

A side airbag device has been known in which the side airbag device includes an airbag main body portion that is deployed forward from one side of a seat back and that is disposed on the upper body (including the head) side of an occupant and an airbag protruding portion that is deployed inward in a seat width direction from the airbag main body portion and that is disposed forward of the face of the occupant in the event of a frontal collision of a vehicle (see, for example, Japanese Unexamined Patent Application Publication No. 2006-008105 (JP 2006-008105 A)).

SUMMARY

However, in a case in which the airbag device is mounted on the side of the seat back, if the head of the occupant is closer to the side on which the airbag device is mounted in the event of a frontal collision of the vehicle, there is a possibility that the airbag gets caught by the head of the occupant when the airbag is deployed, which may delay the deployment of the airbag. As described above, there is room for improvement in the airbag device in which the airbag is deployed by passing the side of the head of the occupant.

Thus, an object of the present disclosure is to obtain a vehicle occupant protection device in which an airbag main body is smoothly deployed even when the airbag device is deployed along a side of a head of an occupant.

In order to achieve the above object, a vehicle occupant protection device according to an aspect of the present disclosure includes: an airbag main body that includes a front-rear chamber that is deployed to a seat front side along a side of a head of an occupant by a gas ejected from an inflator operated when a collision of a vehicle is detected or predicted, and that is disposed on the side of the head of the occupant, and a tip end chamber that is deployed inward in a seat width direction from an end portion of the front-rear chamber on the seat front side and that is disposed forward of a face of the occupant on the seat front side; and a headrest that includes a main body portion that supports the head of the occupant from a seat rear side, and a side portion that is provided on at least a side of the main body portion, that protrudes to the seat front side until a deployment of the front-rear chamber is completed, and that is interposed between the front-rear chamber and the head of the occupant.

According to the above aspect, when a vehicle collision is detected or predicted, the gas ejected from the operated inflator causes the front-rear chamber of the airbag main body to expand to the seat front side along the side of the head of the occupant. At this time, the side portion of the headrest protrudes toward the seat front side by the time the deployment of the front-rear chamber of the airbag main body is completed, and is interposed between the front-rear chamber and the head of the occupant. Therefore, for example, even when the head portion of the occupant is closer to the side described above, the airbag main body is smoothly deployed without being caught by the head portion of the occupant.

In the aspect described above, the side portion may be configured to protrude toward the seat front side when a speed of the vehicle is equal to or higher than a predetermined value.

According to the configuration described above, the side portion protrudes toward the seat front side when the speed of the vehicle is equal to or higher than the predetermined value. Thus, before the airbag main body is deployed, the side portion is surely arranged on the side of the head of the occupant, and the lateral displacement of the head of the occupant is corrected in advance.

In the aspect described above, the side portion may be configured to protrude toward the seat front side when the collision of the vehicle is detected or predicted.

According to the configuration described above, the side portion may protrude toward the seat front side when the collision of the vehicle is detected or predicted. Thus, before the airbag main body is deployed, the side portion is surely arranged on the side of the head of the occupant, and the lateral displacement of the head of the occupant is corrected in advance.

In the aspect described above, the side portion may be rotatably attached to the main body portion with a seat up-down direction serving as an axial direction.

According to the configuration described above, the side portion may be rotatably attached to the main body portion with the seat up-down direction serving as the axial direction. Thus, the configuration of the headrest is simplified as compared with the case where the side portion slides and protrudes in the front-rear direction of the seat, for example.

In the aspect described above, the side portion may be rotatably attached to the main body portion with a seat up-down direction serving as an axial direction, and may be configured to protrude toward the seat front side by being pushed by the airbag main body that is deployed.

According to the configuration described above, the side portion is rotatably attached to the main body portion with the seat up-down direction serving as the axial direction, and protrudes toward the seat front side by being pushed by the airbag main body that is deployed. Thus, it is not necessary to provide the headrest with a protruding mechanism that makes the side portion protrude toward the seat front side, and the configuration of the headrest is simplified.

In the aspect described above, the side portion may be also rotatably attached to an opposite side of the main body portion from the side with the seat up-down direction serving as the axial direction, and by being pushed by the airbag main body that is deployed, another side portion may be configured to protrude to the seat front side in conjunction with one side portion protruding to the seat front side.

According to the configuration described above, side portions are provided on both sides of the main body portion so as to be rotatable, and the other side portion protrudes to the seat front side in conjunction with one side portion protruding to the front side by being pushed by the airbag main body that is deployed. Thus, the lateral displacement of the head of the occupant is surely corrected, and the configuration of the headrest is simplified as compared with the case where the protrusion mechanism is provided on each side portion.

Further, in the aspect described above, the side portion may include a side portion main body and an extension portion that is configured to be able to move in and out of the side portion main body.

According to the configuration described above, the side portion includes the side portion main body and the extension portion that is configured to be able to move in and out of the side portion main body. That is, the length of the side portion can be changed. Thus, the side portion with the protruding extension portion directs the occupant's field of vision to the front side, and as a result, the lateral displacement of the head of the occupant is corrected.

In the aspect described above, the vehicle occupant protection device may be configured to operate a pre-crash seatbelt device when the collision of the vehicle is detected or predicted in a state where the side portion protrudes to the seat front side.

According to the configuration described above, the vehicle occupant protection device is configured to operate the pre-crash seatbelt device when the collision of the vehicle is detected or predicted in the state where the side portion protrudes to the seat front side. That is, the head of the occupant is pressed toward the main body portion of the headrest. Thus, the lateral displacement of the head of the occupant can be reliably corrected, and the head of the occupant is arranged at the center portion of the main body portion of the headrest in the seat width direction.

As described above, according to the present disclosure, even an airbag device that deploys by passing the side of a head portion of an occupant can smoothly deploy an airbag main body.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments according to the present disclosure will be described in detail with reference to the drawings. For convenience of description, the arrow UP, the arrow FR, and the arrow RH appropriately shown in the figures indicate the upward direction of a seat, the forward direction of the seat, and the right direction of the seat, respectively. Thus, when terms indicating directions, i.e., upward and downward, forward and rearward, and right and left are used in the following description without any specification, these mean upward and downward of the vehicle seat, forward and rearward of the vehicle seat, and right and left of the vehicle seat. Further, the right-left direction is synonymous with a seat width direction.

Further, a vehicle occupant protection device 10 according to the present embodiment is provided on a headrest 20 of a vehicle seat 16 as the rear seat of a vehicle 12. Therefore, although the vehicle seat 16 according to the present embodiment will be described as the rear seat, the vehicle occupant protection device 10 according to the present embodiment may be used on the headrest of the vehicle seat (not shown) as the front seat of the vehicle 12.

Further, as will be described later, an airbag device 30 constituting the vehicle occupant protection device 10 expands forward by passing between a side window 14 serving as a window (see FIG. 7) and a side portion 24 of the headrest 20 (see FIG. 2 and the like). Therefore, this airbag device 30 is applied to a vehicle that does not include a curtain airbag device, and a front-rear chamber 34 to be described below functions as a curtain airbag.

Figure 1:
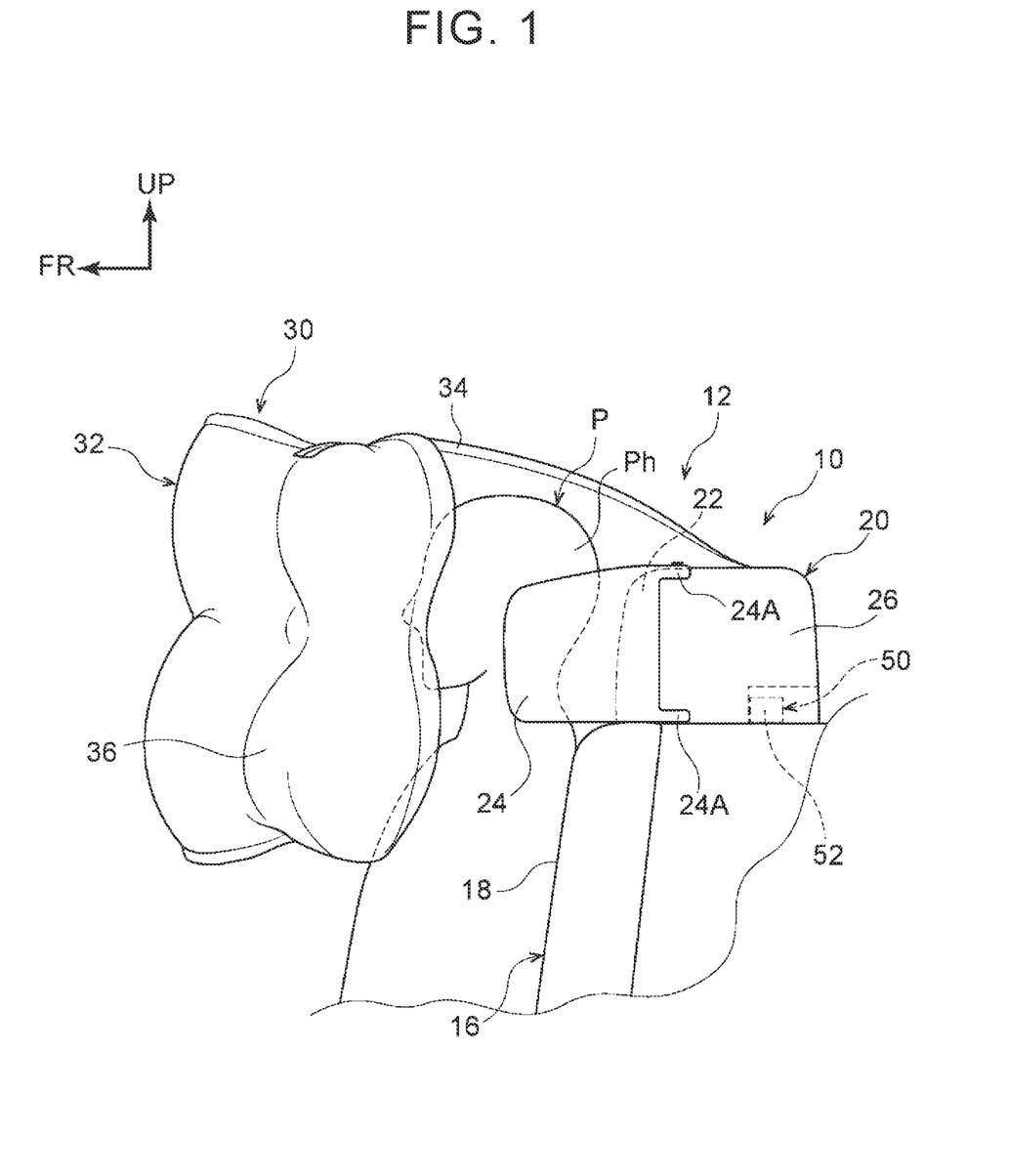
FIG. 1 is a side view showing a headrest and an airbag main body constituting a vehicle occupant protection device according to the present embodiment.

Further, the "window" in the present embodiment includes a state in which the side window 14 is open as well as a state in which the side window 14 is closed. Further, an "occupant P" in the present embodiment as shown in FIG. 1 is, for example, an occupant corresponding to an AM 50 dummy doll.

First Embodiment

First, the vehicle occupant protection device 10 according to the first embodiment will be described. As shown in FIG. 1, the vehicle seat 16 including the vehicle occupant protection device 10 includes a seat cushion (not shown) on which the occupant P sits (supports the buttocks and thighs of the occupant P), a seat back 18 that supports the back of the occupant P, and the headrest 20 that supports a head Ph of the occupant P.

The headrest 20 has a block-shaped main body portion 22 provided at the center portion of the upper end portion of the seat back 18 in the seat width direction so as to be able to move up and down, and a block-shaped side portion 24 in which the inner side end portion (base end portion) in the seat width direction is rotatably attached to the outer side end portions (both side portions) of the main body portion 22 in the seat width direction with the up-down direction set as the axial direction.

That is, at both end portions in the up-down direction of the inner end portion of the side portion 24 in the seat width direction, a substantially semi-disc-shaped overhanging portion 24A extending toward the main body portion 22 side is integrally formed, and a pair of the upper and lower overhanging portions 24A is disposed on the upper end portion and the lower end portion of the outer side end portions of the main body portion 22 in the seat width direction and is rotatably supported by a rotation shaft 25 (see FIG. 2) having the up-down direction as the axial direction.

Figure 2:
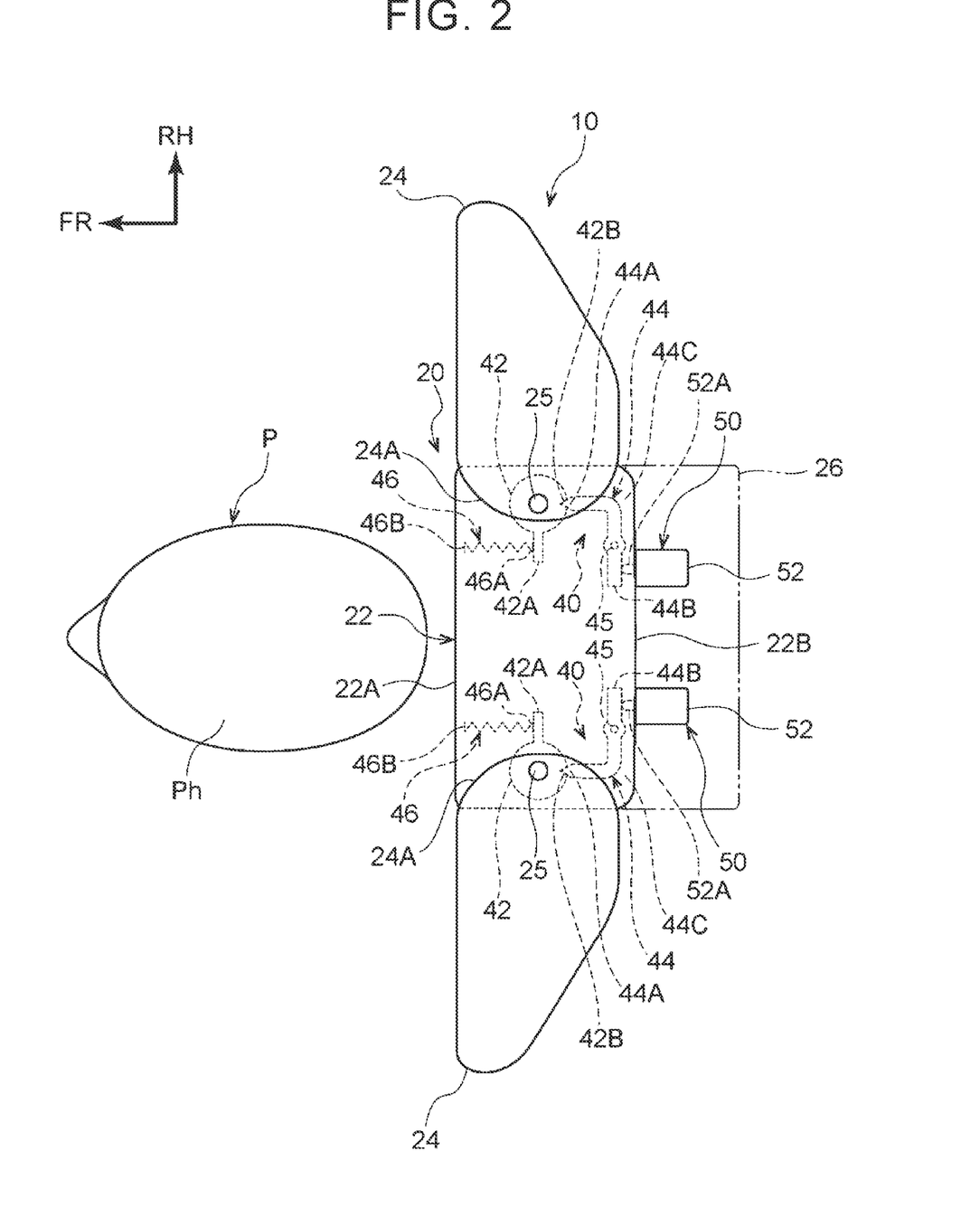
FIG. 2 is an enlarged plan view showing a state before the operation of the headrest constituting the vehicle occupant protection device according to the first embodiment.

As shown in FIG. 2, in a plan view, the main body portion 22 is formed in a substantially rectangular shape with the seat width direction set as the longitudinal direction, and the side portion 24 is formed in a substantially right-angled triangular shape with the slope facing rearward, in an orientation before rotation as shown in FIG. 2. Further, in the following, when the left and right side portions 24 are described separately, the letters "L" and "R" are applied.

Figure 6:
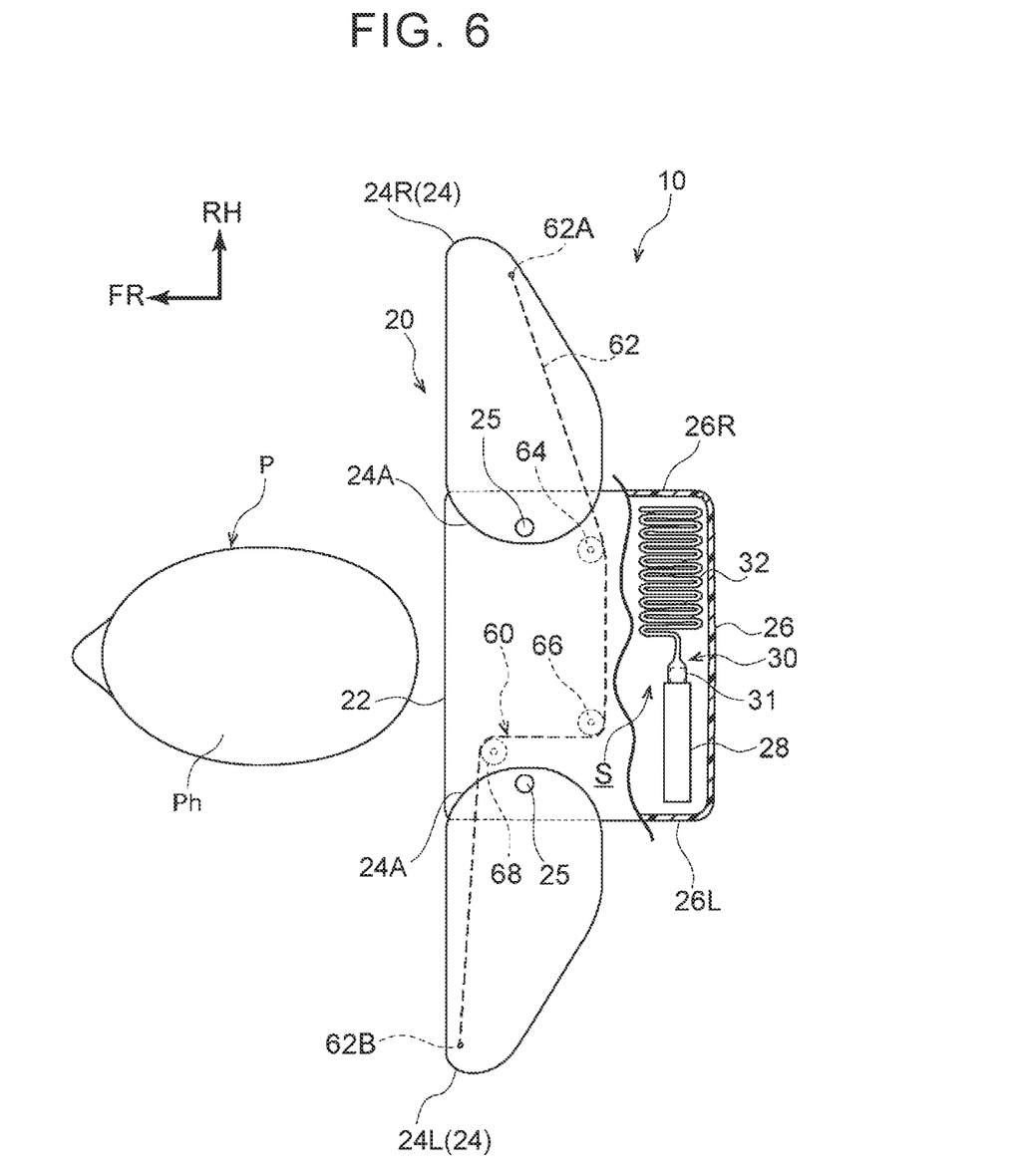
FIG. 6 is an enlarged plan view showing a state before the operation of the headrest constituting the vehicle occupant protection device according to the second embodiment.
Figure 7:
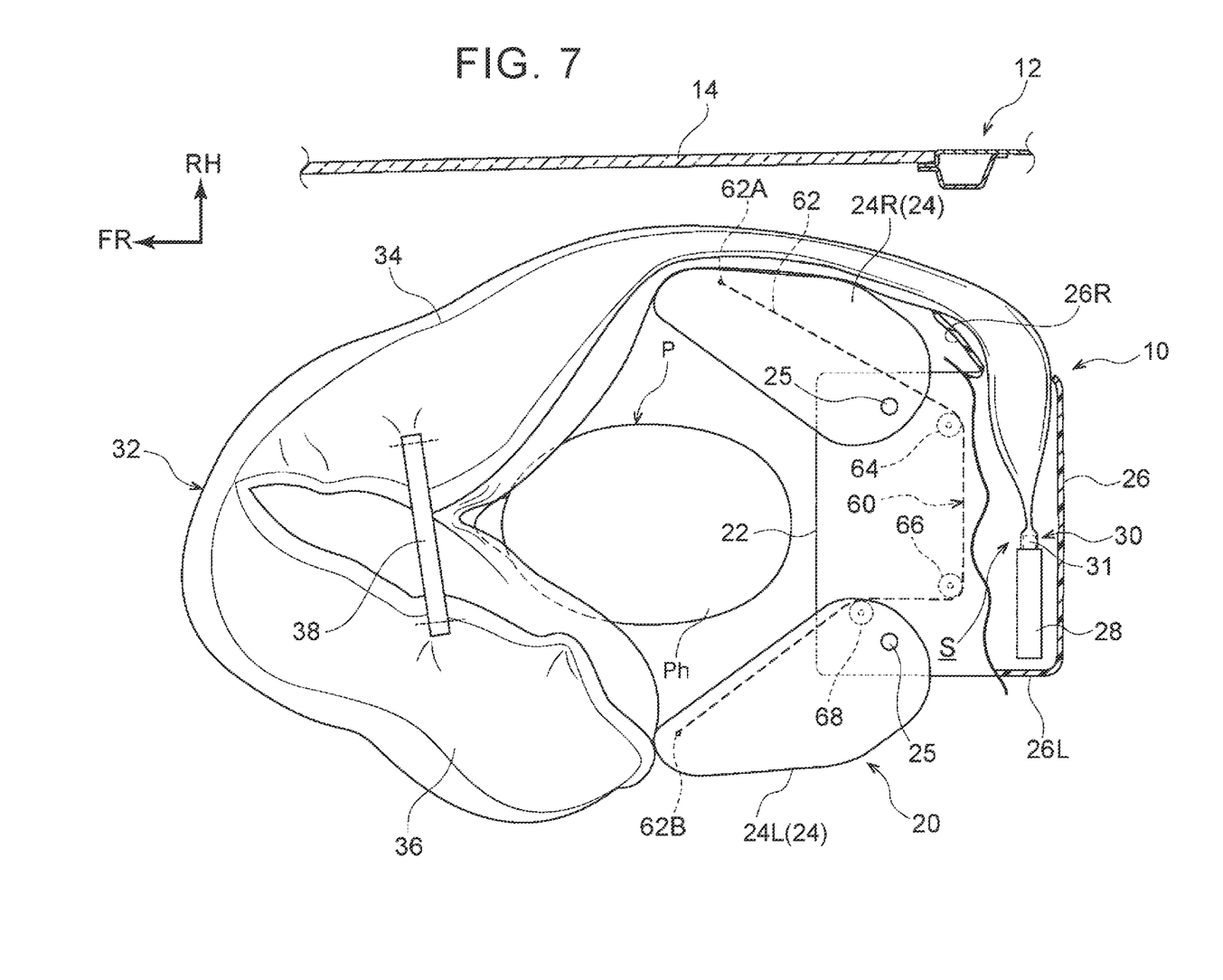
FIG. 7 is an enlarged plan view showing a state after the operation of the headrest constituting the vehicle occupant protection device according to the second embodiment.

As shown in FIG. 1 and FIGS. 6 and 7 of the second embodiment described later, a housing-shaped case portion 26 made of resin is integrally provided on the rear side of the main body portion 22 of the headrest 20. The case portion 26 is covered with a skin material (not shown) together with the main body portion 22, and one of left and right outer walls 26L and 26R of the case portion 26 (the one shown in the figure is the right side outer wall 26R) is designed to be broken by a deployed airbag main body 32.

A predetermined space portion S is formed inside the case portion 26. The airbag main body 32 and an inflator 28 of the airbag device 30 are housed side by side in the space portion S in the seat width direction. That is, in the illustrated case portion 26, the inflator 28 is arranged on the left side, and the airbag main body 32 folded in a bellows shape is housed on the right side.

As shown in FIGS. 1 and 7, the airbag device 30 includes the airbag main body 32 that is deployed forward from the rear side (the one shown in the figure is the right rear side) of a head Ph of the occupant P seated on the vehicle seat 16 by passing along the side of a side portion 24R and the head Ph of the occupant P when gas is ejected from the inflator 28.

The airbag main body 32 includes the front-rear chamber 34 that is disposed on the side of the head Ph of the occupant P (disposed between the side window 14 and the side portion 24R) and a tip end chamber 36 that is deployed inward in the seat width direction from the front end portion of the front-rear chamber 34 and is disposed forward of the face of the occupant P. Then, the airbag main body 32 includes a tether 38 having a string shape that connects a predetermined position at the upper end portion of the front-rear chamber 34 and a predetermined position at the upper end of the tip end chamber 36.

That is, the airbag main body 32 is bent in a substantially "V" shape in a plan view to restrain at least a part of the head Ph and the chest of the occupant P. The tether 38 may be provided so as to connect at least the upper end portion of the front-rear chamber 34 and the upper end portion of the tip end chamber 36, and provided, for example, so as to further connect a predetermined position at the lower end portion of the front-rear chamber 34 and a predetermined position at the lower end portion of the tip end chamber 36.

The inflator 28 has a substantially cylindrical shape, and the outer peripheral portion thereof is supported by a reaction force plate (not shown) having a housing shape via a retainer (not shown) such that the axial center portion thereof is disposed along the seat width direction. The reaction force plate is fixed to, for example, a seat back frame (not shown) via a bracket (not shown), and is configured to be able to receive reaction force transmitted from the airbag main body 32 deployed forward via the inflator 28. The reaction force plate and the retainer are also located in the space S.

The inflator 28 is electrically connected to an airbag electronic control unit (ECU) (not shown) provided in the vehicle 12, and a detection device (not shown) such as a collision detection sensor or a collision prediction sensor, etc. provided in the vehicle 12 and the airbag ECU are electrically connected. Therefore, when a frontal collision of the vehicle 12 is detected or predicted by the detection device, the inflator 28 is operated via the airbag ECU to instantly eject the gas. Then, a connecting portion 31 of the airbag main body 32 is fitted and connected to the ejection port of the inflator 28.

As described above, the airbag main body 32 is housed in the space portion S of the case portion 26 in a state in which the airbag main body 32 is folded in a bellows shape (a plurality of folds that cross each other at a predetermined length). Therefore, as shown in FIG. 7, the airbag main body 32 is deployed forward through the clearance between the side window 14 and the side portion 24R and along the side of the head Ph of the occupant P while the airbag main body 32 having a bellows shape is unwound by the gas ejected from the inflator 28.

Further, the outer wall 26R on the right side of the case portion 26 is broken, for example, linearly along the up-down direction when the airbag main body 32 is deployed. In some embodiments, the portion to be broken is the rear end portion of the outer wall 26R. In other words, a fragile portion or the like that is easily broken at the rear end portion of the outer wall 26R may be formed.

Figure 3:
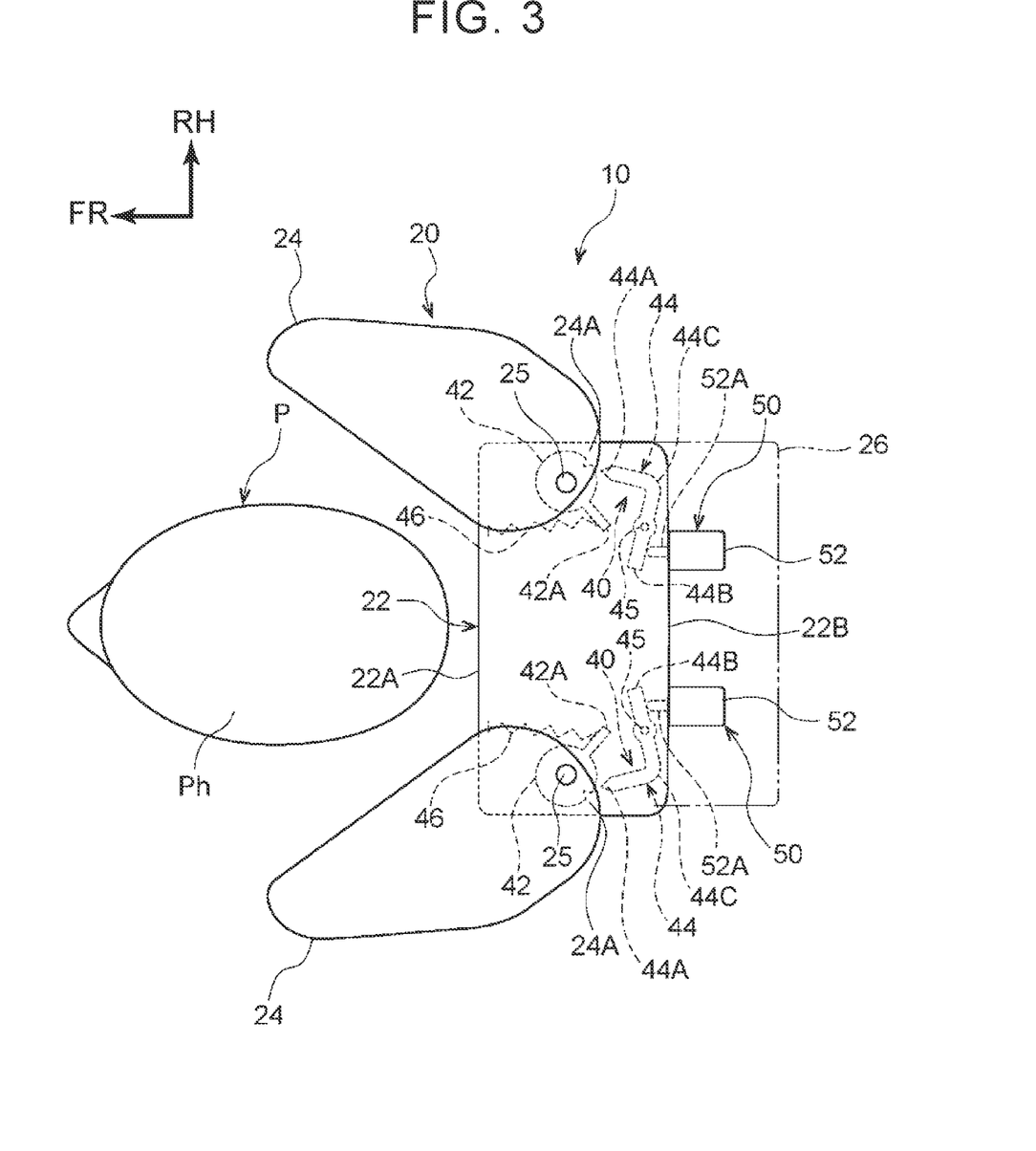
FIG. 3 is an enlarged plan view showing a state after the operation of the headrest constituting the vehicle occupant protection device according to the first embodiment.

As shown in FIGS. 2 and 3, the headrest 20 includes a compression coil spring 46 as an urging member that urges the side portion 24 in a direction to rotate the side portion 24 forward, a lock mechanism 40 that locks the side portion 24 so as not to rotate forward against the urging force of the compression coil spring 46, and a lock release mechanism 50 that unlocks the lock mechanism 40.

Specifically, the lock mechanism 40 is provided inside the main body portion 22. The lock mechanism 40 includes a rotating member 42 that is fitted to the rotation shaft 25 rotatably supporting the side portion 24, that is fixed to the lower overhanging portion 24A, and that has a cylindrical shape and that rotates integrally with the side portion 24, and a locking portion 44 that suppresses the rotating member 42 from rotating.

On the outer peripheral surface of the rotating member 42, is a protruding portion 42A having a substantially rectangular shape in a plan view that protrudes outward in the radial direction (inward in the seat width direction) for a predetermined length, and in which the protruding direction is the longitudinal direction. A rear end portion 46A as one end portion of the compression coil spring 46 is attached to the tip of the protruding portion 42A. A front end portion 46B serving as the other end of the compression coil spring 46 is attached to the inner surface of a front wall 22A of the main body portion 22. Further, on the outer peripheral surface of the rotating member 42, a recess portion 42B is formed as a locked portion recessed in a substantially triangular shape in a plan view.

The locking portion 44 is formed in a substantially "L" shape in a plan view, and a predetermined portion on a one end portion 44B side (inside in the seat width direction) of a bent portion 44C bent at approximately 90 degrees is rotatably supported by a rotation shaft 45 in which the axial direction is the up-down direction. A claw portion 44A that has a substantially triangular shape in a plan view and that can be inserted into the recess portion 42B is integrally formed at the front end portion as the other end of the locking portion 44. Further, the locking portion 44 is always urged by an urging member such as a torsion spring (not shown) so that the claw portion 44A always faces the front side (in the direction of being inserted into the recess portion 42B).

The rear wall 22B of the main body portion 22 is provided with a solenoid 52 as the lock release mechanism 50. The solenoid 52 is provided with a columnar rod 52A that can move in and out in the front-rear direction by energizing and de-energizing. In the state where the rod 52A is most retracted, the tip end portion (front end portion) of the rod 52A is disposed close to the rear surface of one end portion 44B of the locking portion 44 (inner end portion in the seat width direction with respect to the rotation shaft 45).

Thus, when the solenoid 52 is driven by energization and the rod 52A projects forward and presses the one end portion 44B of the locking portion 44 forward, the claw portion 44A of the locking portion 44 rotates rearward about the rotation shaft 45 and is configured to be detached from the recess portion 42B. The solenoid 52 is electrically connected to the above-mentioned detection device, and when the detection device detects or predicts a frontal collision of the vehicle 12, the solenoid 52 is energized and operated.

The lock mechanism 40 and the lock release mechanism 50 having the above configuration adopt the following aspects. First, the side portion 24 is locked so as not to rotate (to maintain the orientation shown in FIG. 2). That is, the side portion 24 that rotates integrally with the rotating member 42 is rotated backward against the urging force of the compression coil spring 46.

Then, the claw portion 44A of the locking portion 44 urged forward by a torsion spring or the like is inserted into the recess portion 42B of the rotating member 42, and the side portion 24 is locked so as to maintain its orientation. In other words, the locking portion 44 suppresses the side portion 24 from rotating forward together with the rotating member 42 due to the urging force of the compression coil spring 46. When the side portion 24 is locked by the lock mechanism 40, the front surface of the main body portion 22 and the front surface of the side portion 24 are flush with each other. Thus, the occupant P can easily shift the head Ph from the main body portion 22 to the side portion 24.

On the other hand, in order to release the lock on the side portion 24, the solenoid 52 is driven. Since the solenoid 52 is electrically connected to the above-mentioned detection device, the rod 52A is protruded forward by being energized by the collision detection or collision prediction of the vehicle 12 by the detection device serving as a trigger.

When the rod 52A protrudes to the front side, since the one end portion 44B of the locking portion 44 is pushed to the front side, the claw portion 44A rotates to the rear side about the rotation shaft 45 and comes off from the recess portion 42B. As a result, the side portion 24 that rotates integrally with the rotating member 42 rotates forward due to the urging force of the compression coil spring 46 and protrudes, and is disposed on the side of the head Ph of the occupant P (inter-disposed between the front-rear chamber 34 and the head Ph of the occupant P).

The solenoid 52 is also electrically connected to a speed sensor (not shown) provided on the vehicle 12, and operates even when the speed of the vehicle 12 is equal to or higher than a predetermined value to release the lock of the lock mechanism 40. That is, the solenoid 52 serving as the lock release mechanism 50 is driven by the time when the deployment of the front-rear chamber 34 is completed. Further, when the speed of the vehicle 12 is set to a predetermined value or more and the side portion 24 is not rotated forward, an alarm by a warning sound, a display, or the like may be generated.

Figure 4A:
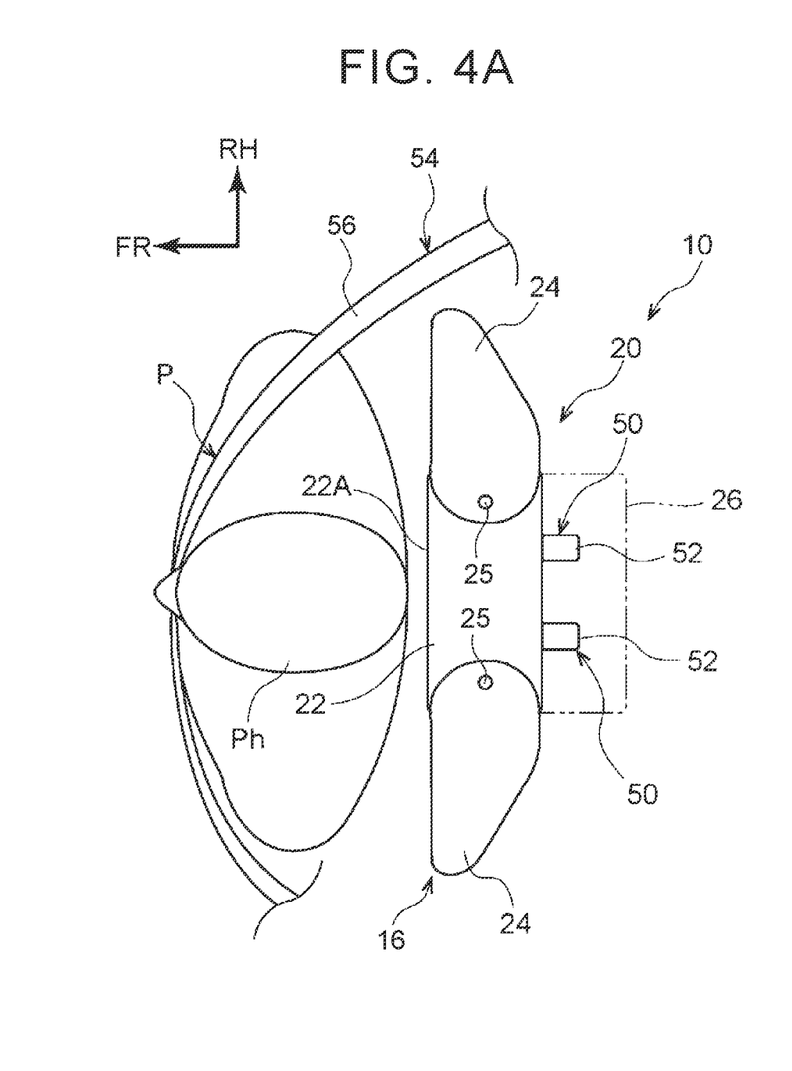
FIG. 4A is a plan view showing a state before the operation of a pre-crash seatbelt device constituting the vehicle occupant protection device according to the first embodiment.

Further, as shown in FIG. 4A, the vehicle seat 16 is provided with a known pre-crash seatbelt device 54. The pre-crash seatbelt device 54 is electrically connected to a control device (not shown) provided in the vehicle 12 and the control device is electrically connected to the detection device. The pre-crash seatbelt device 54 is configured to operate via the control device when the frontal collision of the vehicle 12 is detected or predicted by the detection device in a state where the side portion 24 protrudes forward.

Figure 4B:
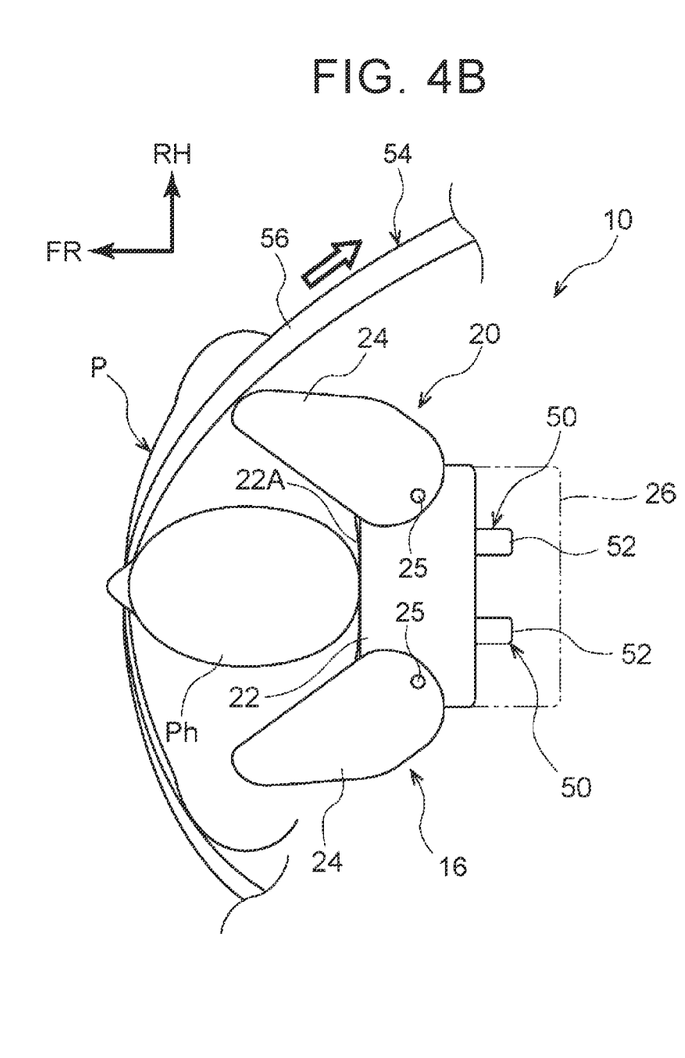
FIG. 4B is a plan view showing a state after the operation of the pre-crash seatbelt device constituting the vehicle occupant protection device according to the first embodiment.

That is, when the frontal collision of the vehicle 12 is detected or predicted, the pre-crash seatbelt device 54 is configured to forcibly wind and pull the seatbelt 56 by a retractor (not shown) as shown by the white arrow in FIG. 4B and the occupant P can be restrained to the seat back 18 more quickly. As a result, the head Ph of the occupant P is pressed toward the front wall 22A of the main body portion 22 of the headrest 20.

Next, the operation of the vehicle occupant protection device 10 according to the first embodiment having the above configuration will be described.

When the detection device detects or predicts that a frontal collision of the vehicle 12 has occurred, the inflator 28 is operated and instantly ejects gas into the airbag main body 32. When gas is ejected into the airbag main body 32, the outer wall 26R of the case portion 26 is broken by the deployed airbag main body 32, the airbag main body 32 is deployed along the side window 14 (passing along the side of the head Ph of the occupant P, and the side portion 24 protrudes to the front side prior to the expansion.

That is, when the detection device detects or predicts that frontal collision of the vehicle 12 will occur, the lock release mechanism 50 operates before or at the same time as the operation of the inflator 28. Specifically, the solenoid 52 is energized, the rod 52A projects forward, and one end portion 44B of the locking portion 44 is pressed forward. As a result, the claw portion 44A of the locking portion 44 rotates rearward about the rotation shaft 45 and is disengaged from the recess portion 42B.

Then, the side portion 24 that rotates integrally with the rotating member 42 rotates forward due to the urging force of the compression coil spring 46 and protrudes, and is disposed on the side of the head Ph of the occupant P. That is, the side portion 24R of the headrest 20 protrudes forward by the time the deployment of the front-rear chamber 34 of the airbag main body 32 is completed, and is interposed between the front-rear chamber 34 and the head Ph of the occupant P.

Therefore, when the airbag main body 32 is deployed, for example, even when the head Ph of the occupant P is closer to the side window 14 side (even when it is displaced toward the side portion 24R side), the position of the head Ph is corrected beforehand by the side portion 24R (the head Ph is forcibly moved to the central portion side of the main body portion 22 in the seat width direction).

As described above, since the side portion 24 is reliably arranged on the side of the head Ph of the occupant P, the lateral displacement of the head Ph of the occupant P can be reliably corrected. Therefore, the airbag main body 32 can be easily and smoothly deployed along the side window 14 without being caught by the head Ph of the occupant P. That is, according to the present embodiment, the deployment performance of the airbag main body 32 can be sufficiently ensured.

Then, the head Ph and at least a part of the chest of the occupant P seated on the vehicle seat 16 is restrained by the fully deployed airbag main body 32 (front-rear chamber 34 and tip end chamber 36). Therefore, it is possible to suppress movement of the head Ph and at least the part of the chest of the occupant P forward due to the inertial force by the airbag main body 32 (front-rear chamber 34 and tip end chamber 36).

Further, as described above, when the frontal collision of the vehicle 12 is detected or predicted, the side portion 24R protrudes forward by the time when the deployment of the front-rear chamber 34 of the airbag main body 32 is completed, and is interposed between the head Ph of the occupant P and the airbag main body 32. Therefore, when the airbag main body 32 is deployed, there is no possibility that the face of the occupant P will be hurt by the airbag main body 32. In other words, the side portion 24R can protect the face of the occupant P when the airbag main body 32 is deployed along the side of the head Ph of the occupant P.

Further, the side portion 24 is rotatably attached to the main body portion 22 with the up-down direction set as the axial direction. Thus, as compared with the case where the side portion 24 is configured to slide and protrude in the front-rear direction, the protruding mechanism of the side portion 24 (configuration of the headrest 20) can be simplified, and an increase in the manufacturing cost in the headrest 20 can be suppressed.

Further, when the frontal collision of the vehicle 12 is detected or predicted in a state where the side portion 24 protrudes forward, the pre-crash seatbelt device 54 is operated. That is, the seatbelt 56 that is forcibly wound up presses the head Ph of the occupant P toward the main body portion 22 of the headrest 20. Thus, the lateral displacement of the head Ph of the occupant P can be reliably corrected, and the head Ph of the occupant P is surely arranged at the center portion of the main body portion 22 of the headrest 20 in the seat width direction. Therefore, it is possible to improve the occupant protection performance when frontal collision of the vehicle 12 occurs.

Further, even when the speed of the vehicle 12 is set to a predetermined value or more, the lock release mechanism 50 (solenoid 52) is activated and the side portion 24 protrudes to the front side. That is, the side portion 24 is disposed on the side of the head Ph of the occupant P before the airbag main body 32 is deployed. Therefore, the lateral displacement of the head Ph of the occupant P can be corrected in advance (the head Ph of the occupant P can be surely returned to the central portion of the main body portion 22 in the seat width direction), and the occupant protection performance when frontal collision of the vehicle 12 occurs can be improved.

Modification

Figure 5:
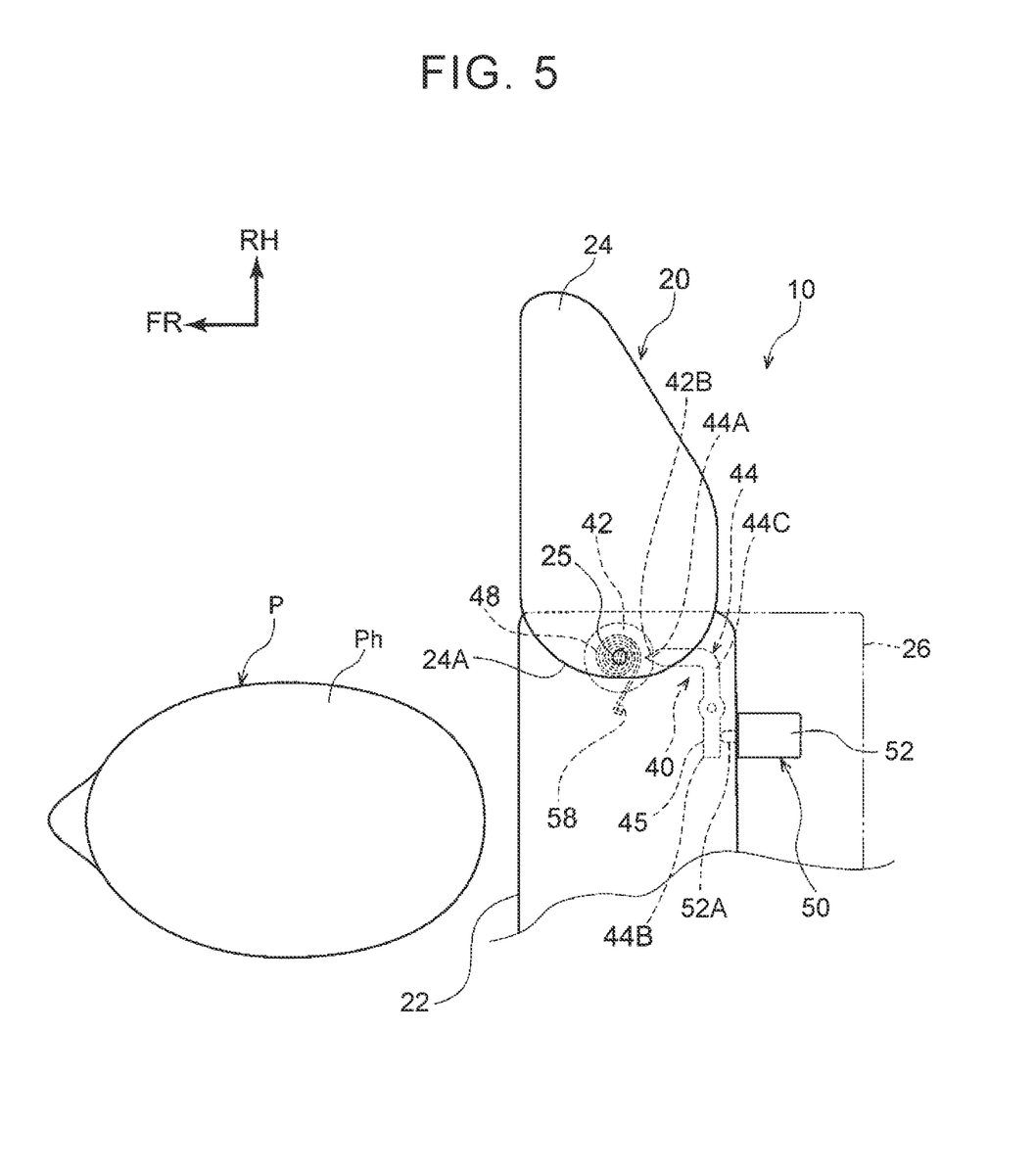
FIG. 5 is an enlarged plan view showing a main portion of a modification of the headrest constituting the vehicle occupant protection device according to the first embodiment.

The urging member that urges the side portion 24 to rotate forward via the rotating member 42 is not limited to the compression coil spring 46, and may be, for example, a spiral spring 48 as shown in FIG. 5. For the spiral spring 48, for example, the central portion may be fitted to the rotation shaft 25, one end thereof may be fixed to the side portion 24, and the other end portion may be fixed to the locking pin 58 provided on the main body portion 22.

Second Embodiment

Next, the vehicle occupant protection device 10 according to the second embodiment will be described. The same parts as those in the first embodiment are designated by the same reference signs, and detailed description thereof (including common operations) will be omitted as appropriate.

As shown in FIGS. 6 and 7, in this second embodiment, the only point that the second embodiment is different from the first embodiment is that the side portion 24R is configured to protrude forward by being pushed by the deployed airbag main body 32. Then, by being pushed by the deployed airbag main body 32, the left side (the other) side portion 24L is also configured to protrude forward in conjunction with the right side (one) portion 24R protruding to the front side.

That is, in this second embodiment, an interlocking mechanism 60 is provided so as to rotate the side portion 24L on the other side (left side) in conjunction with the rotation of the side portion 24R on one side (right side). The interlocking mechanism 60 includes, for example, a wire 62 having a predetermined length and a plurality of rotatable pulleys 64, 66, 68 around which the wire 62 is wound.

Specifically, one end portion 62A of the wire 62 is fixed in the vicinity of the tip portion inside the right side portion 24R. Then, the wire 62 is sequentially wound around the first pulley 64 and the second pulley 66 that is a pair of left and right pulleys that is provided inside the main body portion 22 and on the rear side of the rotation shaft 25 at a distance therebetween in the left-right direction in a side view.

Further, the wire 62 is wound around the third pulley 68 that is provided at the left side end portion inside the main body portion 22 and on the front side of the rotation shaft 25 in a side view, and another end portion 62B of the wire 62 is fixed to the vicinity of the tip portion inside the left side portion 24L.

According to such a configuration, as shown in FIG. 7, when the side portion 24R on the right side is pushed by the deployed airbag main body 32 and rotates forward about the rotation shaft 25, the one end portion 62A of the wire 62 is pulled forward in conjunction to the rotation. Then, the other end portion 62B of the wire 62 is pulled rearward, and the side portion 24L on the left side rotates forward about the rotation shaft 25. Therefore, the position of the head Ph of the occupant P is corrected by the left and right side portions 24 (forcibly moved to the main body portion 22 side).

Further, when the airbag main body 32 is deployed forward from the case portion 26 by the gas ejected from the inflator 28, since the airbag main body 32 is deployed while pushing the right side portion 24R, there is no possibility that the airbag main body 32 is caught by the head Ph of the occupant P. Therefore, the airbag main body 32 can be easily and smoothly deployed along the side window 14.

Then, since the tip end portion (rear end portion) of the tip end chamber 36 and the tip end portion of the side portion 24L are arranged in close proximity or in contact with each other (the airbag main body 32, the side portions 24L and 24R, and the main body portion 22 surround the head Ph by 360°), the head Ph of the occupant P can be further protected. That is, it is possible to further improve the occupant protection performance when frontal collision of the vehicle 12 occurs.

Further, according to the second embodiment, the right side portion 24R protrudes forward by being pushed by the deployed airbag main body 32, and its position is held by the internal pressure of the deployed airbag main body 32. Furthermore, in conjunction with the operation in which the right side portion 24R is pushed by the deployed airbag main body 32 and protrudes forward, the left side portion 24L also protrudes forward and due to the internal pressure of the deployed airbag main body 32, the position of the side portion 24R is held by the internal pressure of the deployed airbag main body 32 and thus, the position of the side portion 24L is also held via the interlocking mechanism 60.

Thus, the lateral displacement of the head Ph of the occupant P can be reliably corrected by the left and right side portions 24, and it is not necessary to provide the headrest 20 with a protruding mechanism for making each side portion 24 protrude forward. That is, the configuration of the headrest 20 can be simplified and the increase in the manufacturing cost of the headrest 20 can be suppressed as compared with the case where the headrest 20 is provided with such a protruding mechanism.

Third Embodiment

Lastly, the vehicle occupant protection device 10 according to the third embodiment will be described. The same parts as those in the first embodiment and the second embodiment are designated by the same reference signs, and detailed description thereof (including common operations) will be omitted as appropriate.

Figure 8A:
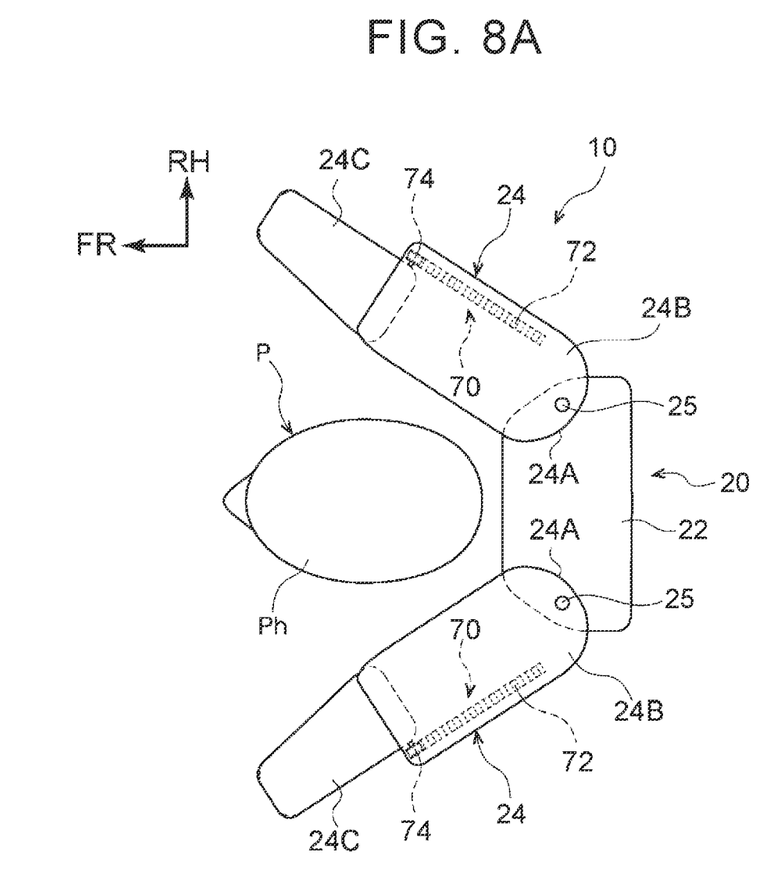
FIG. 8A is a plan view showing a protruding state of a side portion of the headrest constituting the vehicle occupant protection device according to a third embodiment.
Figure 8B:
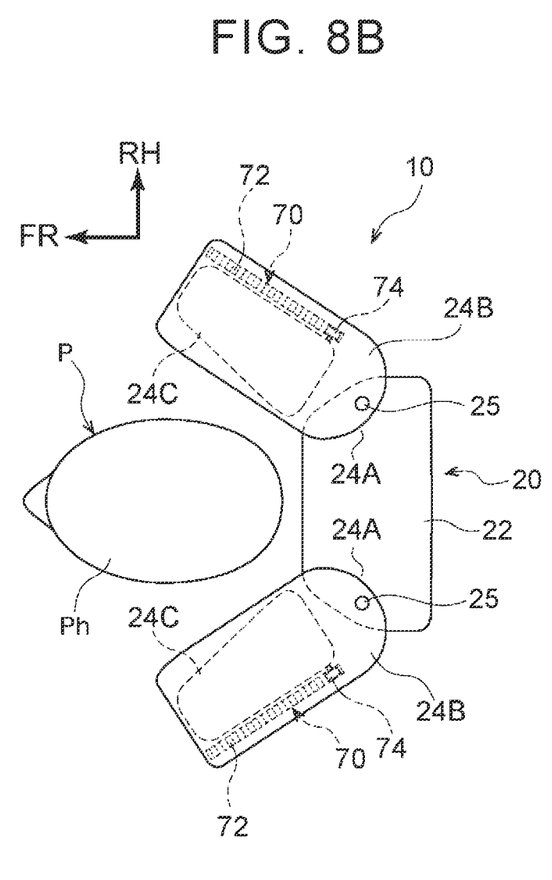
FIG. 8B is a plan view showing a stored state of a side portion of the headrest constituting the vehicle occupant protection device according to a third embodiment.

As shown in FIGS. 8A and 8B, the third embodiment differs from the first and second embodiments only in that the side portion 24 has a double structure. That is, the side portion 24 includes a substantially tubular side portion main body 24B having an open tip end portion, and an extension portion 24C that can take a storage position at which the extension portion 24C is stored inside the side portion main body 24B and a protruding position at which the extension portion 24C protrudes from the tip end portion of the side portion main body 24B, due to the slide mechanism 70.

The slide mechanism 70 is provided inside the side portion main body 24B, and includes, for example, a rack 72 and a pinion 74 that meshes with the rack 72. Specifically, in a state where the side portion 24 is rotated forward, the rack 72 is provided at the outer end portion inside the side portion main body 24B, and the pinion 74 is attached to the outer rear end portion of the extension portion 24C. Further, inside the extension portion 24C, a motor (not shown) for rotationally driving the pinion 74 in both forward and reverse directions is provided.

Thus, when the pinion 74 rotates due to the rotational drive of the motor, the extension portion 24C moves forward along the rack 72 and protrudes forward from the tip end portion of the side portion main body 24B. Then, when the pinion 74 rotates in the reverse direction due to the rotational drive of the motor in the reverse direction, the extension portion 24C moves to the rear side along the rack 72 and is stored inside the side portion main body 24B.

As described above, when the extension portion 24C is configured to be able to move in and out of the side portion main body 24B, as shown in FIG. 8A, due to the side portion 24 on which the extension portion 24C protrudes, a view of the occupant P is directed further toward the front. Therefore, in this third embodiment, the configuration is such that when the speed of the vehicle 12 becomes equal to or higher than a predetermined value, the motor is driven and the extension portion 24C is protruded.

According to this, when the speed of the vehicle 12 becomes equal to or higher than a predetermined value, the lateral displacement of the head Ph of the occupant P can be corrected as a result, and the head Ph of the occupant P can be disposed to the center portion of the main body portion 22 in the seat width direction. When the head Ph of the occupant P is disposed at the center portion of the main body portion 22 in the seat width direction in this way, the occupant protection performance when frontal collision of the vehicle 12 occurs can be further improved.

When the airbag main body 32 is deployed, the extension portion 24C is housed in the side portion main body 24B as shown in FIG. 8B. That is, when the airbag main body 32 is deployed, the side portion 24 (side portion main body 24B) is interposed between the airbag main body 32 and the head Ph of the occupant P, similar to the first embodiment and the second embodiment.

Therefore, there is no risk that the airbag main body 32 becomes caught by the head Ph of the occupant P, and the airbag main body 32 can be easily and smoothly deployed forward from the case portion 26 through a clearance between the side window 14 and the side portion 24R (along the side window 14). In the third embodiment, when the deployment of the airbag main body 32 is not hindered, the extension portion 24C may be in a protruding state when the airbag main body 32 is deployed.

The vehicle occupant protection device 10 according to the present embodiment has been described above with reference to the drawings, but the vehicle occupant protection device 10 according to the present embodiment is not limited to the illustrated examples and its design can be changed as appropriate within the scope of the present disclosure. For example, the vehicle occupant protection device 10 according to the present embodiment may be provided on the headrest of the vehicle seat (not shown) in the center of the rear seat of the vehicle 12.

For example, the reaction force plate that supports the inflator 28 may be fixed to the headrest support (not shown) via a bracket (not shown) instead of being fixed to the seat back frame. Further, the side portion 24 is not limited to a configuration in which the side portion 24 is rotatably supported on both side portions of the main body portion 22 in the seat width direction, and may have a configuration in which the side portion 24 slides and protrudes from both side portions inside the main body portion 22 in the seat width direction. However, it is preferable that the side portion 24 has a rotating configuration rather than a sliding configuration because it is cheaper and can be easily manufactured.

Further, the configuration is not limited to the configuration in which the side portions 24 are provided on both side portions of the main body portion 22 in the seat width direction. The side portion 24 may be configured to be provided on at least one side portion on which the airbag main body 32 is deployed. However, in some embodiments, the side portions 24 may be provided on both sides of the main body portion 22 in the seat width direction from the viewpoint of improving the protection performance of the occupant P against the head Ph.

Further, the lock mechanism 40 and the lock release mechanism 50 in the first embodiment are not limited to the illustrated configuration. Similarly, the interlocking mechanism 60 in the second embodiment is not limited to the configuration including the wire 62, the first pulley 64, the second pulley 66, and the third pulley 68. Further, the slide mechanism 70 in the third embodiment is not limited to the configuration including the rack 72 and the pinion 74.

What is claimed is:

1. A vehicle occupant protection device comprising:
    an airbag main body that includes a front-rear chamber configured to be deployed to a seat front side by a gas ejected from an inflator operated when a collision of a vehicle is detected or predicted, and configured to be disposed on the side of the head of the occupant, and a tip end chamber that is deployed inward in a seat width direction from an end portion of the front-rear chamber on the seat front side and configured to be disposed forward of a face of the occupant on the seat front side; and a headrest that includes a main body portion configured to support the head of the occupant from a seat rear side, and a side portion that is provided on at least a side of the main body portion, that protrudes to the seat front side when a deployment of the front-rear chamber is completed, and that is configured to be interposed between the front-rear chamber and the head of the occupant, the side portion being rotatably fixed to the main body portion of the headrest, the airbag main body extending through an outer wall of the main body portion on a seat rear side of the side portion of the headrest when the airbag main body is deployed.

2. The vehicle occupant protection device according to claim 1, wherein the side portion is configured to protrude toward the seat front side when a speed of the vehicle is equal to or higher than a predetermined value.

3. The vehicle occupant protection device according to claim 1, wherein the side portion is configured to protrude toward the seat front side when the collision of the vehicle is detected or predicted.

4. The vehicle occupant protection device according to claim 1, wherein the side portion is rotatably attached to the main body portion with a seat up-down direction serving as an axial direction.

5. The vehicle occupant protection device according to claim 1, wherein the side portion is rotatably attached to the main body portion with a seat up-down direction serving as an axial direction, and is configured to protrude toward the seat front side by being pushed by the airbag main body that is deployed.

6. The vehicle occupant protection device according to claim 5,
wherein the side portion is also rotatably attached to an opposite side of the main body portion from the side with the seat up-down direction serving as the axial direction, and
wherein by being pushed by the airbag main body that is deployed, another side portion is configured to protrude to the seat front side in conjunction with one side portion protruding to the seat front side.

7. The vehicle occupant protection device according to claim 1, wherein the side portion includes a side portion main body and an extension portion that is configured to be able to move in and out of the side portion main body.

8. The vehicle occupant protection device according to claim 1, wherein the vehicle occupant protection device is configured to operate a pre-crash seatbelt device when the collision of the vehicle is detected or predicted in a state where the side portion protrudes to the seat front side.

* * * * *